(12) United States Patent
Miryala et al.

(10) Patent No.: US 6,742,101 B2
(45) Date of Patent: May 25, 2004

(54) SCALABLE AND FLEXIBLE METHOD FOR ADDRESS SPACE DECODING IN A MULTIPLE NODE COMPUTER SYSTEM

(75) Inventors: Sudheer Miryala, San Jose, CA (US); Jeremy J. Farrell, Campbell, CA (US); Kazunori Masuyama, Kanazawa (JP); Patrick N. Conway, Los Altos, CA (US)

(73) Assignee: Fujitsu Limited, Kawasaki (JP)

( * ) Notice: Subject to any disclaimer, the term of this patent is extended or adjusted under 35 U.S.C. 154(b) by 161 days.

(21) Appl. No.: 10/153,480

(22) Filed: May 21, 2002

(65) Prior Publication Data

US 2003/0005156 A1 Jan. 2, 2003

Related U.S. Application Data

(60) Provisional application No. 60/301,775, filed on Jun. 29, 2001.

(51) Int. Cl.⁷ ............................................... G06F 12/10
(52) U.S. Cl. ..................... 711/202; 711/220; 711/221; 709/245
(58) Field of Search ................................. 711/200, 202, 711/220, 221; 710/305; 709/245

(56) References Cited

U.S. PATENT DOCUMENTS

| | | | |
|---|---|---|---|
| 2003/0005070 A1 | * | 1/2003 | Narasimhamurthy et al. .... 709/213 |
| 2003/0007457 A1 | * | 1/2003 | Farrell et al. ............... 370/235 |

* cited by examiner

*Primary Examiner*—Hiep T. Nguyen
(74) *Attorney, Agent, or Firm*—Fenwick & West LLP

(57) ABSTRACT

A multi-node computer system includes a plurality of I/O nodes, CPU nodes, memory nodes, and hybrid nodes connected via an interconnect. A CPU node or an I/O node issues a request. An address decoder residing in the interconnect decodes the request to determine whether the request is a coherent memory request. The address decoder also determines a physical destination node address of the request based on a logical node address stored in the request.

11 Claims, 5 Drawing Sheets

SCALABLE AND FLEXIBLE METHOD FOR ADDRESS SPACE DECODING IN A MULTIPLE NODE COMPUTER SYSTEM

RELATED APPLICATION

This application claims priority under 35 U.S.C. §119(e) from U.S. provisional application No. 60/301,775 entitled "SCALABLE AND FLEXIBLE METHOD FOR ADDRESS SPACE DECODING IN A MULTIPLE NODE COMPUTER SYSTEM", filed on Jun. 29, 2001 by Jeremy J. Farrell, Kazunori Masuyama, Sudheer Miryala, and Patrick N. Conway, which provisional application is incorporated herein by this reference in its entirety.

FIELD OF THE INVENTION

The present invention relates generally to multi-node computer systems, and more specifically to a mechanism for decoding a destination node address of a memory request in a multi-node computer system.

BACKGROUND OF THE INVENTION

Multi-node computer networks may include central processor unit (CPU) nodes, memory nodes, input/output (I/O) nodes, and hybrid nodes (with any combination of memory, I/O, and CPU). These nodes are connected via a system interconnect, which is responsible for address decoding, i.e., for determining to which node a request should be routed.

In multi-node computer systems, memory has high latency compared to present day CPU speeds. This means that the time for a memory node to respond to a read or write request is large. Another frequent bottleneck is the maximal throughput, i.e., the amount of data a memory system can provide per unit time. Memory interleaving is a well-known technique that allows a multi-node computer system to increase throughput by splitting the memory system across a group of nodes at an interleave size. For example, in a system with four memory nodes with an interleave size of x, a base address B can be mapped to Node 0. Address B+x is mapped to Node 1, B+2x to Node 2, B+3x to Node 3, and B+4x to Node 0. This allows the system to avoid any hot memory spots as well as to increase the system performance.

As multi-node computer systems are becoming larger, it becomes important to be able to address many nodes. Existing methods require base and size (limit) declaration for each node in the system. Thus, if there are n nodes in the system, they require n base registers and n size registers. As the number of nodes increases, the memory registers holding the {base, size} pairs increase linearly, thereby requiring very large amount of chip real estate.

Another disadvantage of existing methods is that in order to determine quickly the destination node address of the request, existing solutions require multiple magnitude comparators. There is typically one magnitude comparator for each node. As the number of nodes is added, more {base, size} pairs must be added and more magnitude comparators are needed. The cost of implementation of these magnitude comparators is usually very high. Thus, existing decode schemes are not scalable enough to support many address nodes.

Yet another disadvantage of conventional implementations having multiple nodes and using interleaving, is that conventional systems use a fixed interleave size and a limited number of combination of nodes for each interleave group.

To summarize, existing decode schemes are not scalable enough to support many address nodes. In addition, existing address decoding schemes are not flexible enough to allow different sizes for interleaving and to allow a variety of interleave sets.

What is needed, therefore, is an improved mechanism for address space decoding in a multi-node computer system.

SUMMARY OF THE INVENTION

The present invention includes a system for address space decoding in a multi-node computer system. In accordance with an embodiment of the present invention, a multi-node computer system includes a plurality of I/O nodes, CPU nodes, memory nodes, and hybrid nodes connected by an interconnect (as shown in FIG. 1). In one embodiment of the present invention, a request issued by a CPU node or an I/O node includes an address comprising a base field that stores a base address of a destination node; an index field that stores a logical address of a destination node; and a granularity field that stores a size of an addressable space of a memory node.

The system further includes an address decoder adapted to extract a base address of a destination node, using a width of the base field. The address decoder is also configured to extract a logical address of a destination node, using a width of the index field and the granularity field. The address decoder further comprises a base register for storing a number of bits indicating the width of the base field; an index register for storing a number of bits indicating the width of the index register; and a granularity register for storing a number of bits indicating a width of the granularity field. The width of the granularity field is used to determine where the index field starts in the address. The address decoder further comprises a base offset register for storing a programmed base offset indicating where a memory node is mapped in a system address space; a logical comparator for performing a comparison between the base address and the base offset to determine whether the request for data is made to a memory node; and a mapping table for mapping the extracted logical address of a destination node to a physical node address where the request is routed.

The present invention also includes a method for address space decoding in the multi-node computer system. Initially, a messaging driver causes a CPU node or an I/O node to issue a request to a memory node. The request includes an address. The address decoder extracts a base field of the address using the width of the base field. A logical comparison is performed between the base address and the programmed base offset. If the two match, it indicates that the request is a coherent memory request, i.e., it is made to a memory node. If the request is a coherent memory request, the address decoder extracts a logical node address of the destination node using the width of the index field and the granularity field. A physical destination node address is determined based on the logical node address by indexing into the mapping table.

The present invention advantageously performs a logical comparison instead of performing arithmetic comparisons to decode a destination of the request. This obviates the need of having multiple magnitude comparators. Furthermore, as the number of nodes in a multi-node computer system increases, the memory registers do not increase linearly. As a result, the implementation cost does not scale linearly, but remains small.

DETAILED DESCRIPTION OF THE INVENTION

Figure 1:
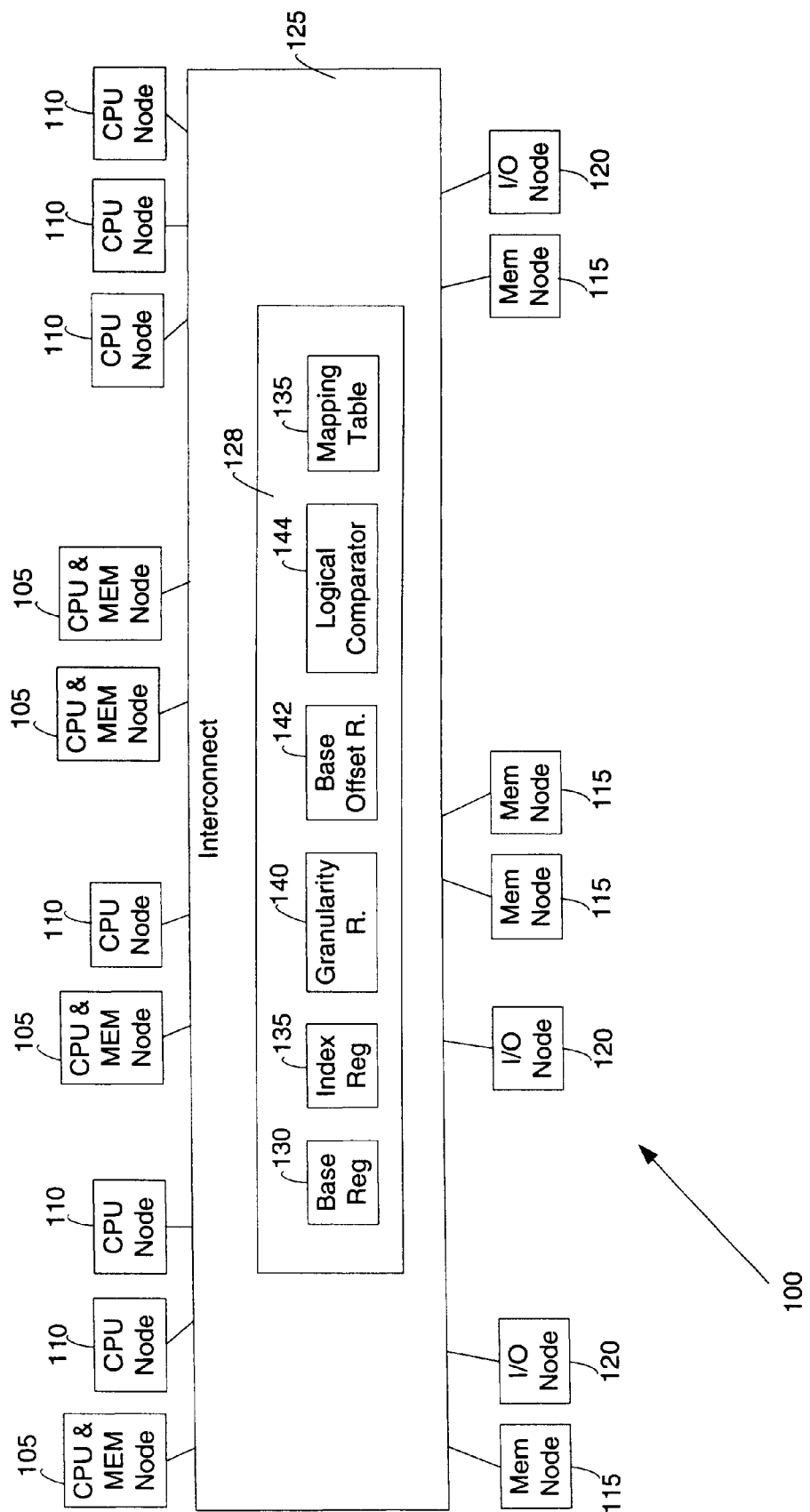
FIG. 1 is a block diagram of an overall architecture of a distributed multi-node computer system in accordance with an embodiment of the present invention.

Referring now to FIG. 1, there is shown a block diagram of an overall architecture of a distributed multi-node computer system 100. System 100 includes a plurality of nodes: CPU nodes 110a–110n (generally 110); memory nodes 115a–115n (generally 115); I/O nodes 120a–120n (generally 120), and hybrid nodes 105a–105n (generally 105). Hybrid nodes 105 may combine CPU node 110 and memory node 115. Each CPU node 110 is a conventional processing unit, for example, an Intel or Intel-compatible Pentium™ class or higher processor, a Sun SPARC™ class or higher processor, or an IBM/Motorola PowerPC™ class or higher processor. Each I/O node 120 is a conventional I/O system, for example, a storage device, an input device, a peripheral device, or the like. Each memory node 115 is a conventional memory system, for example, a dynamic random access memory (DRAM) system, a static random access memory (SRAM) system, or the like. Any of the CPU node 110, I/O node 120, hybrid node 105 can issue a coherent memory request to memory node 115.

As shown in FIG. 1, nodes 105, 110, 115, and 120 in system 100 are connected via an Interconnect 125. Interconnect 125 may be, for example, a mesh, a ring or a hypercube implemented using routers or switches. Interconnect 125 provides a path between any pair of nodes and routes a message from one node to another in system 100.

System 100 has an address space. The address space is divided among any number nodes. The address space provides a set of memory addresses for accessing memory nodes 115. This area is referred to as a coherent address space. The coherent address space is divided into a plurality of memory windows. The coherent address space of system 100 is discussed in more detail below in connection with FIG. 3.

Figure 2:
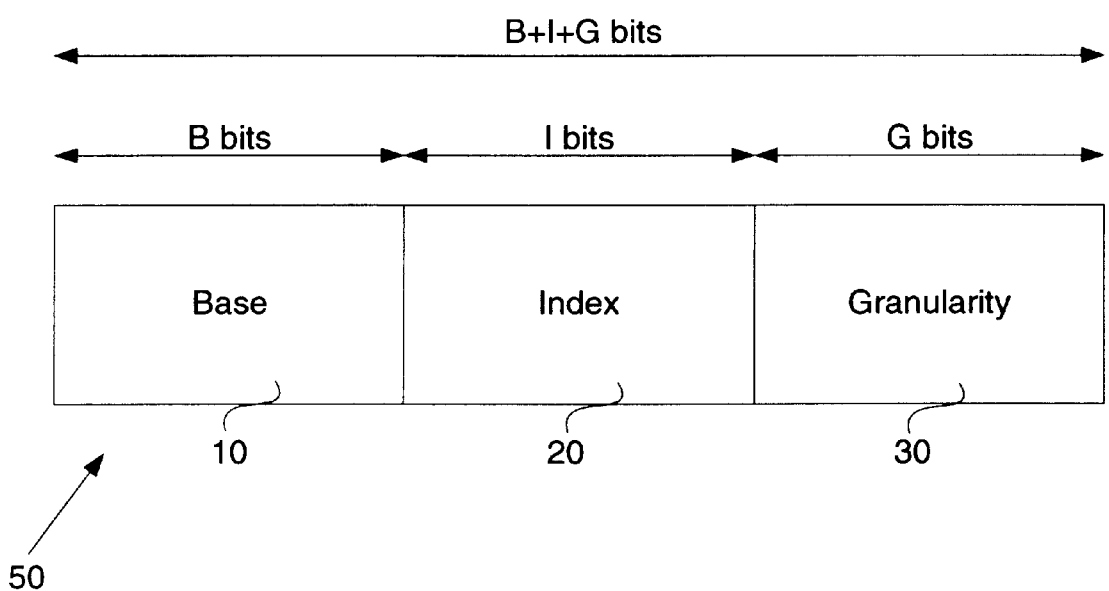
FIG. 2 is a pictorial illustration of a preferred format of an address of a memory request.

Referring now to FIG. 2, it shows a preferred address 50 format for a request issued by CPU node 110 or I/O node 120 to memory node 115. The address 50 includes the following fields: a base field 10; an index field 20; and a granularity field 30.

The granularity field 30 preferably indicates the number of cache lines stored in each memory window 40 in the coherent address space 210 of system 100. The granularity field is G bits wide. There could be $2^G$ cache lines stored in each memory window 40.

The index field 20 preferably stores the logical address of each node (logical node ID) of system 100. The index field 20 can be adjusted based on the number of addressable memory nodes. Index field 20 can be 0 bits wide when there is only one node in the system 100. Index field 20 can be 1 bits wide when there are 2 nodes in the system 100. Likewise, index field 20 can be 2 bits wide for 3 or 4 nodes, 3 bits wide for 5 to 8 nodes and so on.

The base field 10 stores a base address. The width of base field 10 is equal to (total address bits−(index bits+granularity bits)). The total number of bits of the base field 10 and granularity field 30 determines the size of the addressable space per node. The base address stored in base field 10 indicates the base address of a node to which the request for data is made. As will be described in more detail below, the base address is used to determine whether the request is a coherent memory request.

Figure 3:
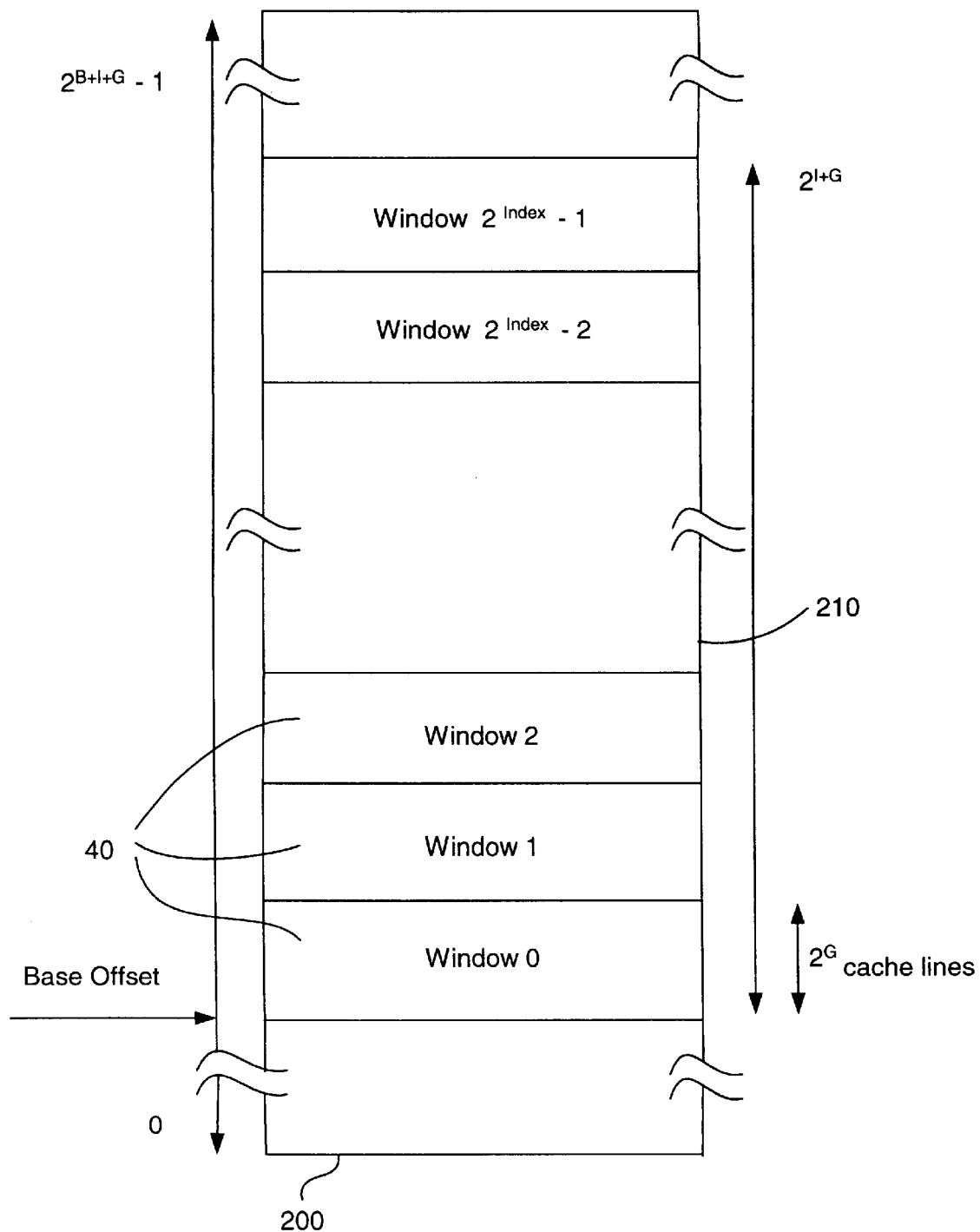
FIG. 3 is a pictorial illustration of a coherent address space in a system address map.

Referring now to FIG. 3, it pictorially illustrates address space 200 of system 100. Address space 200 starts at 0 and has a size of $2^{B+I+G}$ bytes. As used herein, B is the width of the base field 10, I is the width of the index field 20, and G is the width of the granularity field 30 (all shown in FIG. 2). As previously discussed, system address space 200 provides a set of memory addresses for accessing memory 115. This area is referred to as coherent address space 210. Coherent address space 210 has a size of $2^{I+G}$ bytes. An arrow pointing to the bottom of window 0 of the coherent address space 210 indicates the address where coherent address space 210 starts in the address space 200. This address is called a base offset and is stored in a base offset register 142 shown in FIG. 1.

Coherent address space 210 is divided into $2^I$ memory windows 40. The size of each memory window 40 in the coherent address space 210 is the addressable space per memory node 115 in system 100. There could be $2^G$ cache lines stored in each window 40. As an illustrative example, if G=20, I=4, B=8 and the cache line size is 1B, there could be 16 ($2^4$) number of windows 40 in the coherent address space 210 in the system address space 200. Each memory window 40 will then have a size of 1 MB ($2^{20}$).

Referring again to FIG. 1, system 100 further comprises an address decoder 128 configured to receive a request issued by CPU node 110 or I/O node 120 and to extract the base address from the base field 10 of the address 50 included in the request. Address decoder 128 extracts the base address based on the width, B, of the base field 10. Address decoder 128 is further configured to extract a logical node address from index field 20 of the address 50 shown in FIG. 2. Address decoder 128 may be implemented as software, hardware, or any combination thereof. Address decoder 128 preferably comprises a base register 130, index register 135, granularity register 140, base offset register 142, logical comparator 144, and mapping table 145.

Base register 130 preferably defines the number of bits (width) programmed to store the base address of the base field 10 of the address 50 of the memory request shown in FIG. 2. Index register 135 defines the number of bits used by the index field 20 of the address 50. Granularity register 140 defines the number of bits used by the granularity field 30 of the address 50. The width of the granularity field 30 is used to determine where the index field 20 starts. Base register 130, index register 135, and granularity register 140 are programmed at the system initialization time.

Base offset register 142 stores a base offset indicating where the coherent address space 210 starts in the system address space 200 (shown in FIG. 3). The base offset is a programmed constant.

Logical comparator 144 preferably performs a logical comparison between the base address stored in base field 10 shown in FIG. 2 and the base offset. If the base address matches the base offset, it indicates that the request is a coherent memory request, i.e., it is made to memory node 115. Performing logical comparisons instead of arithmetic comparisons is advantageous because it eliminates the requirement of having multiple magnitude comparators. Further, it scales with the additional number of nodes in the system 100.

Mapping table 145 preferably stores mappings of logical node addresses to physical destination-node addresses for each node in system 100. Mapping table 145 can be implemented as a DRAM, SRAM, or any equivalent thereof. An example of mapping table 145 is shown in FIG. 4.

Figure 4:
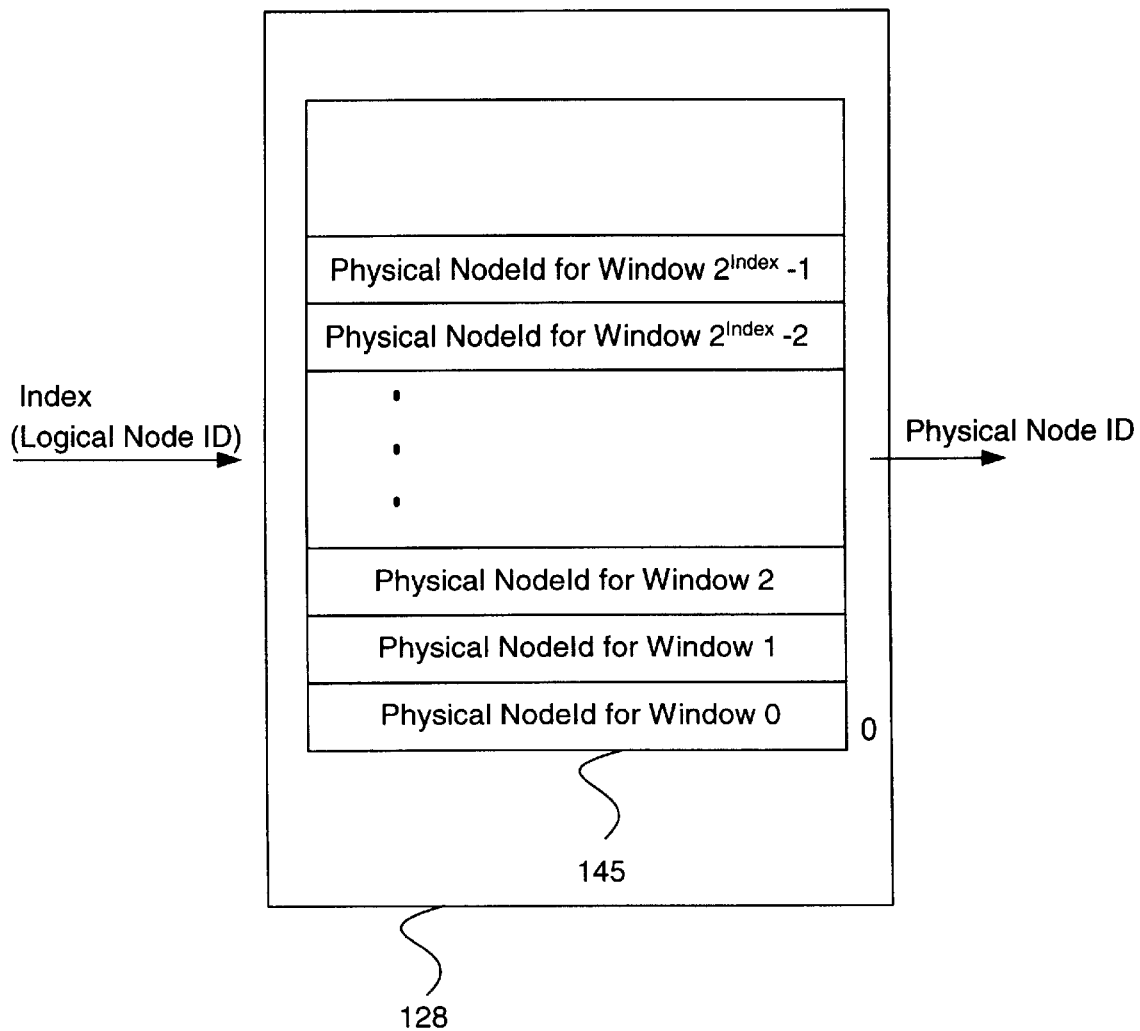
FIG. 4 is a block diagram of a logical node address to a physical node address mapping table in accordance with an embodiment of the present invention.

Referring now to FIG. 4, it illustrates a logical node ID to a physical node ID mapping table 145. The mapping table 145 stores one entry for each node supported by the system 100. It should be understood that there are at least as many entries in the mapping table 145 as there are nodes supported by the system 100. Mapping table 145 shown in FIG. 4 stores $2^I$ entries, wherein I indicates the width of index field 20 of address 50 shown in FIG. 2.

The present invention preferably supports interleaving by having many memory windows mapped to a single memory node 115 in system 100 and by having many-to-one mappings in the mapping table 145.

Figure 5:
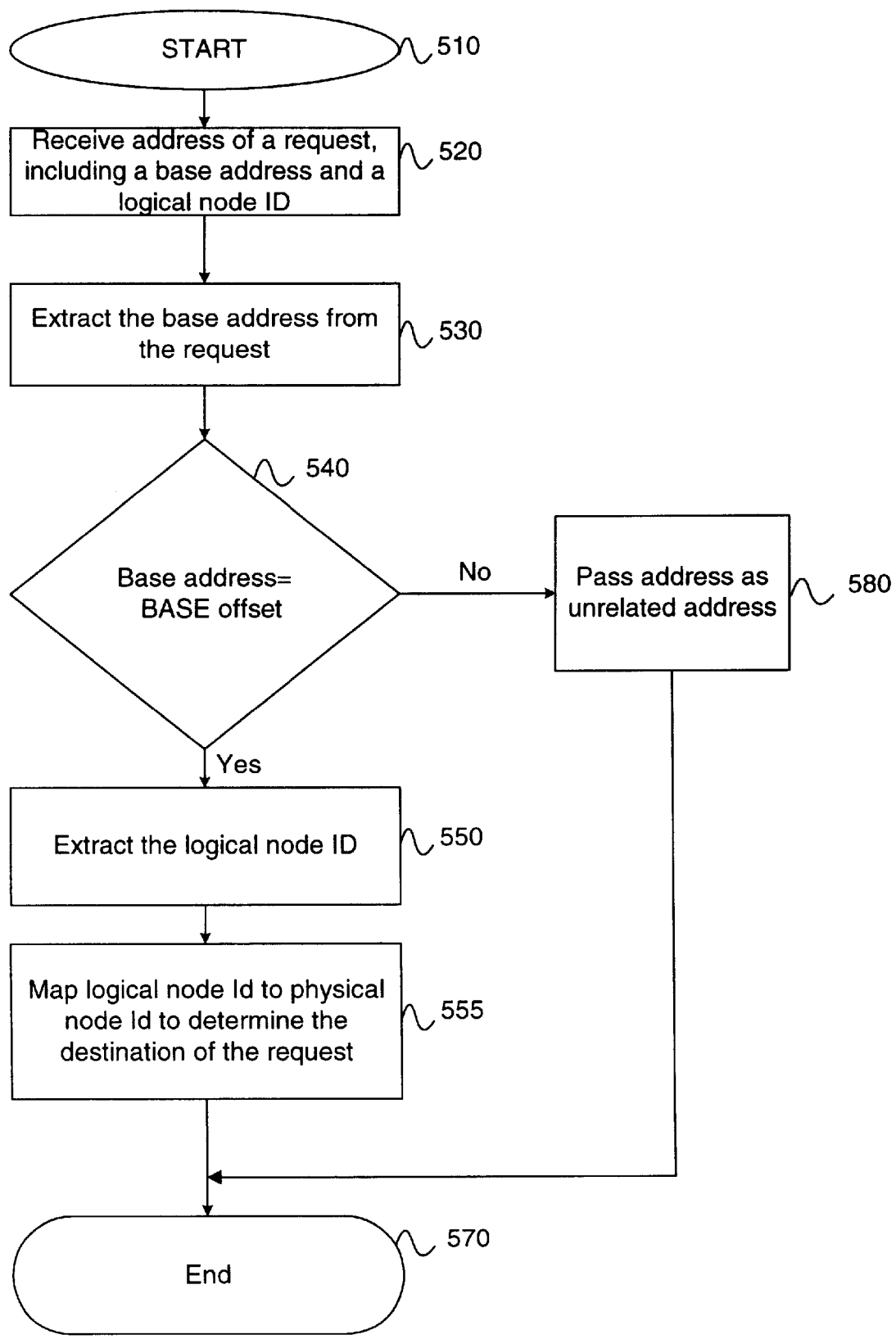
FIG. 5 is a flow chart of a method performed by the system of FIG. 1.

Referring now to FIG. 5, there is shown a flow chart of a method for decoding the destination node address of the request performed by the system 100. The process starts 510 and a messaging driver (not shown) causes CPU 110 to issue a request to memory node 115. It should be understood that I/O node 120 can also issue a request to memory node 115. Address decoder 128 (shown in FIG. 1) receives the width of the base field 10, the index field 20, and the granularity 30. Address decoder 128 extracts 530 the base address from the base field 10 of the address, based on the width of the base field 10, B. Address decoder 128 then compares 540 the base address with the base offset stored in base offset register 142 (shown in FIG. 1). If the two match, it indicates that the request is a coherent memory request, i.e., it is made to a memory node. Once it is determined that the request is a coherent memory request, address decoder 128 extracts 550 a logical node address of the destination node (logical node ID) from the index field 20 of the address, based on the width of the index field 20. To determine where the index field starts, address decoder 128 uses the width of the granularity field 30, G.

Address decoder 128 then indexes into the mapping table 145 based on the logical node ID to determine 555 a physical node address for the destination node, and the process ends in 570. As an illustrative example, if I=4, address decoder 128 extracts a four-bit logical node ID stored in the index field 20. If the logical node ID, for example, is '0011', which is a logical representation of a digital number '3', indexing into the mapping table 145 based on the logical node ID '3' allows address decoder 128 to determine a physical node ID to which the request is routed.

In the alternative, if the base address and the base offset register 142 do not match, the request is not a coherent memory request 580.

An embodiment of the present invention utilizes a decoding mechanism to derive the destination node address for a given logical address using a mapping table. Performing a logical comparison instead of arithmetic comparisons to determine the physical destination node address obviates the need of having multiple magnitude comparisons. As the number of nodes in a multi-node computer system increases, the memory registers do not increase linearly. As a result, the implementation cost does not scale linearly, but remains small.

What is claimed this:

1. In a multi-node computer system including an I/O node, a CPU node, and a memory node connected by an interconnect, a method for determining a destination node address of a request for data, the method comprising:

receiving the request for data, the request including an address;

extracting a base address of a destination node from the address;

comparing the base address with a base offset, the base offset indicating where the memory node is mapped in the system address space; and responsive to the base address matching the base offset:
extracting a logical node address from the address; and
determining a physical destination node address of the request, based on the logical node address.

2. The method of claim 1, wherein the base address is extracted using a width of the base field.

3. The method of claim 1, wherein the logical node address is extracted using a width of the index field.

4. A multi-node computer system comprising:

an address decoder for receiving a request for data, the request including an address, and for extracting from the address a base address of a destination node and a logical node address;

a comparator residing in the address decoder, the comparator for performing a logical comparison between the extracted base address and a base offset indicating where the memory node is mapped in a system address space; and a mapping table residing in the address decoder, the mapping table for mapping the logical node address to a physical destination node address of the request for data.

5. The system of claim 4, wherein the address decoder further comprises a base offset register for storing the base offset.

6. The system of claim 5, wherein the base offset is a programmed constant.

7. The system of claim 4, wherein the base address is stored in a base field of the address, and wherein the address decoder further comprises a base register for indicating a width of the base field.

8. The system of claim 7, wherein the address decoder extracts the base address based on the width of the base field.

9. The system of claim 4, wherein the logical node address is stored in an index field of the address, and wherein the address decoder further comprises an index register for indicating a width of the index field.

10. The system of claim 9, wherein the address decoder extracts the logical node address based on the width of the index field.

11. The system of claim 4, wherein the address further comprises a granularity field indicating a size of an addressable space of the memory node.

* * * * *